(12) United States Patent
Hidaka et al.

(10) Patent No.: US 7,354,526 B2
(45) Date of Patent: Apr. 8, 2008

(54) PROCESSING METHOD FOR GLASS SUBSTRATE, PROCESSED GLASS PRODUCT AND STRESS APPLYING APPARATUS

(75) Inventors: Takeshi Hidaka, Tokyo (JP); Hiroaki Kasai, Tokyo (JP); Masamichi Hijino, Kitatsuru-gun (JP); Yasushi Nakamura, Kitatsuru-gun (JP); Akihiro Koyama, Takarazuka (JP); Keiji Tsunetomo, Amagasaki (JP); Junji Kurachi, Takarazuka (JP); Hirotaka Koyo, Takarazuka (JP); Shinya Okamoto, Osaka (JP); Yasuhiro Saito, Takatsuki (JP)

(73) Assignees: Olympus Corporation, Tokyo (JP); Nippon Sheet Glass Co., Ltd., Tokyo (JP)

( * ) Notice: Subject to any disclaimer, the term of this patent is extended or adjusted under 35 U.S.C. 154(b) by 187 days.

(21) Appl. No.: 10/993,422

(22) Filed: Nov. 19, 2004

(65) Prior Publication Data

US 2005/0130426 A1 Jun. 16, 2005

Related U.S. Application Data

(63) Continuation of application No. PCT/JP2004/001997, filed on Feb. 20, 2004.

(30) Foreign Application Priority Data

Mar. 3, 2003 (JP) ............................ 2003-056263

(51) Int. Cl.
*B44C 1/22* (2006.01)

(52) U.S. Cl. .............................. 216/80; 216/76; 216/88; 65/30.14; 65/31; 65/61; 65/111; 65/116; 360/254; 428/141; 428/426; 428/691; 428/66.6; 451/35; 451/36; 451/41; 451/104

(58) Field of Classification Search ............... 65/30.14; 216/76, 80; 365/222; 360/254; 428/141, 428/426; 451/35, 36
See application file for complete search history.

(56) References Cited

U.S. PATENT DOCUMENTS

| | | | | |
|---|---|---|---|---|
| 4,969,944 A | * | 11/1990 | Marechal et al. | ............. 65/104 |
| 6,627,565 B1 | * | 9/2003 | Zou et al. | ...................... 501/4 |
| 6,782,717 B2 | * | 8/2004 | Saito et al. | ................ 65/30.14 |
| 6,913,702 B2 | * | 7/2005 | Kurachi et al. | ................ 216/11 |

FOREIGN PATENT DOCUMENTS

| | | |
|---|---|---|
| JP | 2002-030440 | 1/2002 |
| JP | 2002-160943 | 6/2002 |
| JP | 2003-073145 | 3/2003 |

\* cited by examiner

*Primary Examiner*—Nadine Norton
*Assistant Examiner*—Maki Angadi
(74) *Attorney, Agent, or Firm*—Hogan & Hartson LLP

(57) ABSTRACT

A processing method for glass substrate of the present invention includes: applying heat and external force to a glass substrate and then cooling it down to thereby form a compression stressed part having a different etching rate from that of other parts with respect to an etching reagent to be used, on the surface of the glass substrate and in the vicinity thereof, and performing chemical etching using the etching reagent on the glass substrate having the compression stressed part formed thereon, so as to form a relief on the surface of the glass substrate.

18 Claims, 9 Drawing Sheets

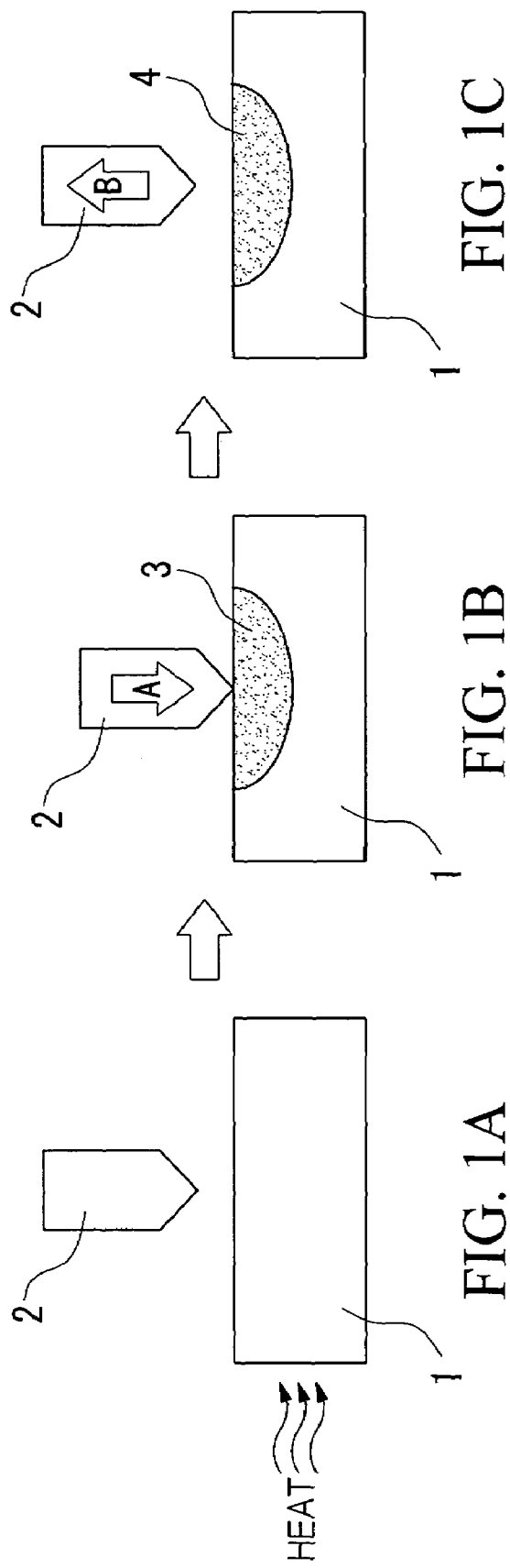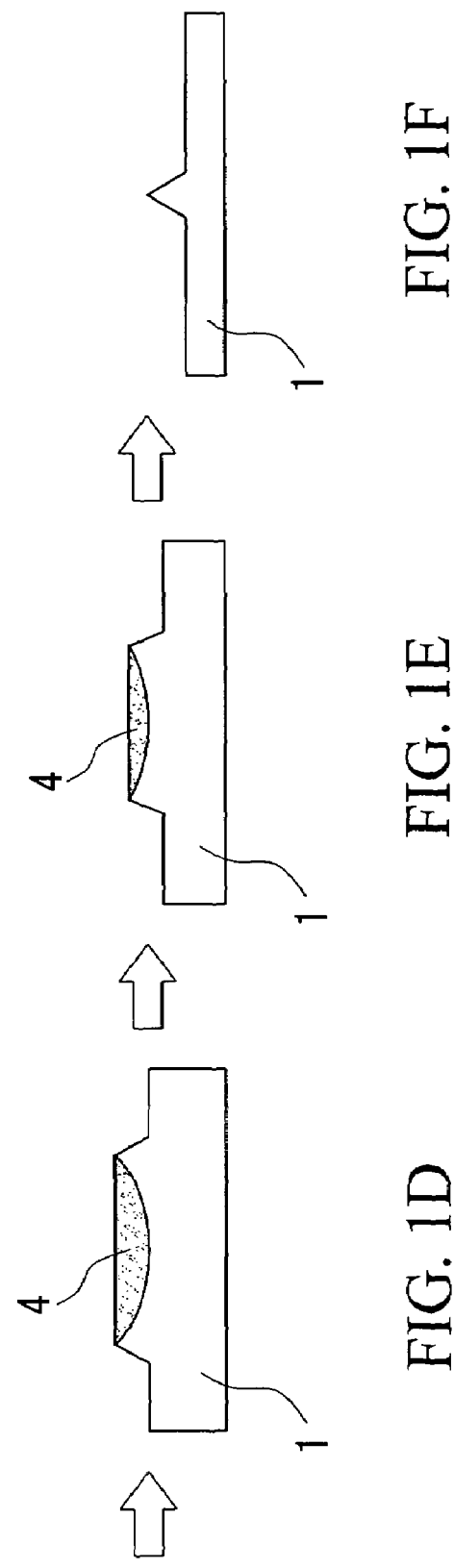

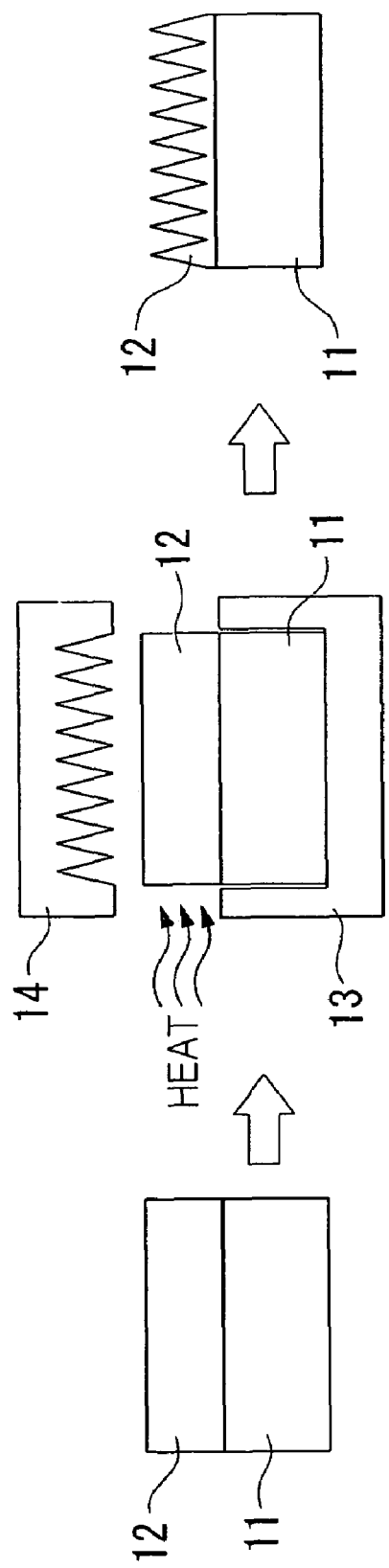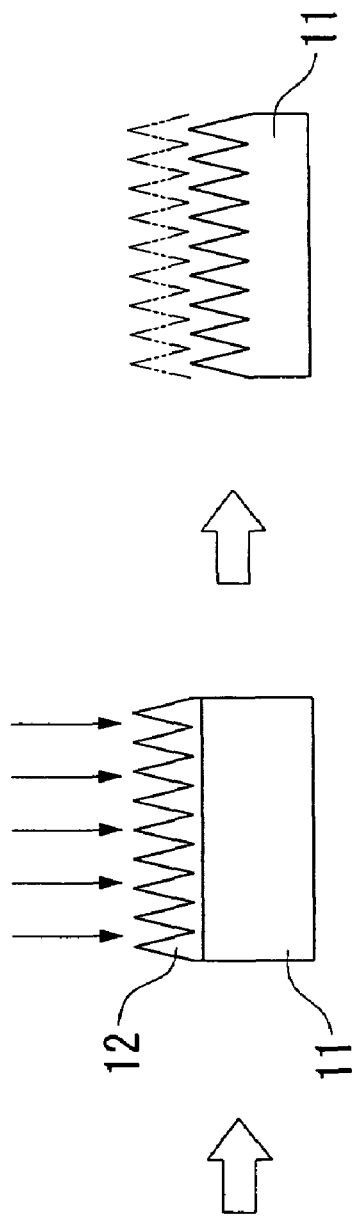

PROCESSING METHOD FOR GLASS SUBSTRATE, PROCESSED GLASS PRODUCT AND STRESS APPLYING APPARATUS

This application is a continuation application of International Patent Application No. PCT/JP2004/001997, filed on Feb. 20, 2004, which claims priority from Japanese Patent Application No. 2003-056263, filed on Mar. 3, 2003.

BACKGROUND OF THE INVENTION

Olympus Corporation and Nippon Sheet Glass Co. were under a Joint Research Agreement in effect prior to the date the invention was made and was made as a result of activity undertaken within the scope of the Joint Research Agreement.

1. Field of the Invention

The present invention relates to a processing method for glass substrate for forming a relief on the surface of glass substrate, a processed glass product obtained by the processing method, and a stress applying apparatus which applies stress to the surface of glass substrate.

2. Description of Related Art

Conventionally, there have been various processing methods for glass substrate for forming a relief on the surface of the glass substrate. As an example, a method has been proposed wherein, in order to deal with the recent demand for even higher densification of disks in the field of HDDs (hard disk drives), with the object of forming surface projections having an even height in desired positions on amorphous material (glass), a predetermined pressure force is applied to parts of the surface of the amorphous material to form a densified compressed layer. Then the outer layer is removed using processing agents with different removal capability depending on this compressed layer and other non-compressed layers, so that the compressed layer can be processed into a projecting shape (see Japanese Laid-open Paten Publication JP-2002-160943-A).

Incidentally, similarly to the processing method proposed in the above patent document, in a processing method wherein an external force is applied onto a glass substrate to form the compressed layer so that a relief is formed on the surface of the glass substrate utilizing the difference in etching rate between the compressed layer and non-compressed layer, the condition is required such that the glass substrate is not cracked when forming the compressed layer.

SUMMARY OF THE INVENTION

A first aspect of a processing method for glass substrate according to the present invention includes: applying heat and external force to a glass substrate and then cooling it down to thereby form a compression stressed part having a different etching rate from that of other parts with respect to an etching reagent to be used, on the surface of the glass substrate and in the vicinity thereof; and performing chemical etching using the etching reagent on the glass substrate having the compression stressed part formed thereon, so as to form a relief on the surface of the glass substrate.

A second aspect of a processing method for glass substrate according to the present invention includes: forming a film composed of one or more layers of inorganic material on a glass substrate; applying heat and external force to the film and then cooling it down to thereby form a compression stressed part having a different etching rate from that of other parts with respect to an etching reagent to be used, on the surface of the film and in the vicinity thereof; and performing chemical etching using the etching reagent on the film having the compression stressed part formed thereon, so as to form a relief on the surface of the film.

The second aspect of a processing method for glass substrate according to the present invention may further include: performing etching on the glass substrate having the film with the relief formed on the surface, formed thereon, so as to form a relief on the surface of the glass substrate.

In this case, a projection formed on the surface of the glass substrate may be composed of the glass substrate, or the glass substrate and the film.

In this case, a material having a higher etching rate than that of the film may be used for the glass substrate.

At the first or second aspect of a processing method for glass substrate according to the present invention, the external force may be applied by pressing a mold having a desired shape.

In this case, heat and external force may be applied by pressing the mold which has been heated.

The material of the mold may be harder than the material of a part of the glass substrate or the material of the film formed on the glass substrate, to which the heat and external force are applied.

At the first or second aspect of a processing method for glass substrate according to the present invention, the external force may be applied by pressing an indenter.

In this case, heat and external force may be applied by pressing the indenter which has been heated.

The external force may be applied by pressing and sweeping the indenter.

A point of the indenter may be in the shape of a part of a sphere.

A point of the indenter may be in a knife edge shape.

The indenter may be multiply provided.

The material of the indenter may be harder than the material of a part of the glass substrate or the material of film formed on the glass substrate, to which the heat and external force are applied.

At the first or second aspect of a processing method for glass substrate according to the present invention, external force may be applied by making particles collide.

In this case, heat and external force may be applied by making the particles which have been heated collide.

The particles may be controlled to collide so as to make the compression stressed part into a desired shape.

The material of the particle may be harder than the material of a part of the glass substrate or the material of film formed on the glass substrate, to which the heat and external force are applied.

A glass product according to the present invention may include a relief formed on the surface thereof by the processing method according to the first aspect or the second aspect.

The processed glass product may be a chip member for a microchemical system.

A first aspect of a stress applying apparatus according to the present invention includes: an indenter which applies an external force by pressing or pressing and sweeping onto the surface of a glass substrate or a film formed on the glass substrate so as to form a compression stressed part of a desired shape; a heat source which heats at least one of the surface of the glass substrate or the surface of the film, and the indenter; a driving device which moves at least one of the indenter and the glass substrate; and a controller which controls the driving device and the heat source.

A second aspect of a stress applying apparatus according to the present invention includes: a mold which applies an external force by pressing onto the surface of a glass substrate or a film formed on the glass substrate so as to form a compression stressed part of a desired shape; a heat source which heats at least one of the surface of the glass substrate or the surface of the film, and the mold; a driving device which moves at least one of the mold and the glass substrate; and a controller which controls the driving device and the heat source.

A third aspect of a stress applying apparatus according to the present invention includes: a particle ejecting device which ejects particles onto the surface of a glass substrate or a film formed on the glass substrate so as to form a compression stressed part of a desired shape; a heat source which heats at least one of the surface of the glass substrate or the surface of the film and the particles; a driving device which moves at least one of the particle ejecting device and the glass substrate; and a controller which controls the driving device and the heat source.

One of the first, the second, the third aspects may includes a gas supply device which supplies an inert gas into a chamber accommodating the glass substrate.

BRIEF DESCRIPTION OF THE DRAWINGS

FIG. 1A, FIG. 1B, FIG. 1C, FIG. 1D, FIG. 1E, and FIG. 1F are explanatory diagrams of an example of a process for forming a relief on the surface of a glass substrate, according to a first embodiment of the present invention.

FIG. 2A, FIG. 2B, FIG. 2C, FIG. 2D, and FIG. 2E are explanatory diagrams of an example of a process for forming a relief on the surface of a glass substrate, according to a second embodiment of the present invention.

DETAILED DESCRIPTION OF THE INVENTION

Figure 3:
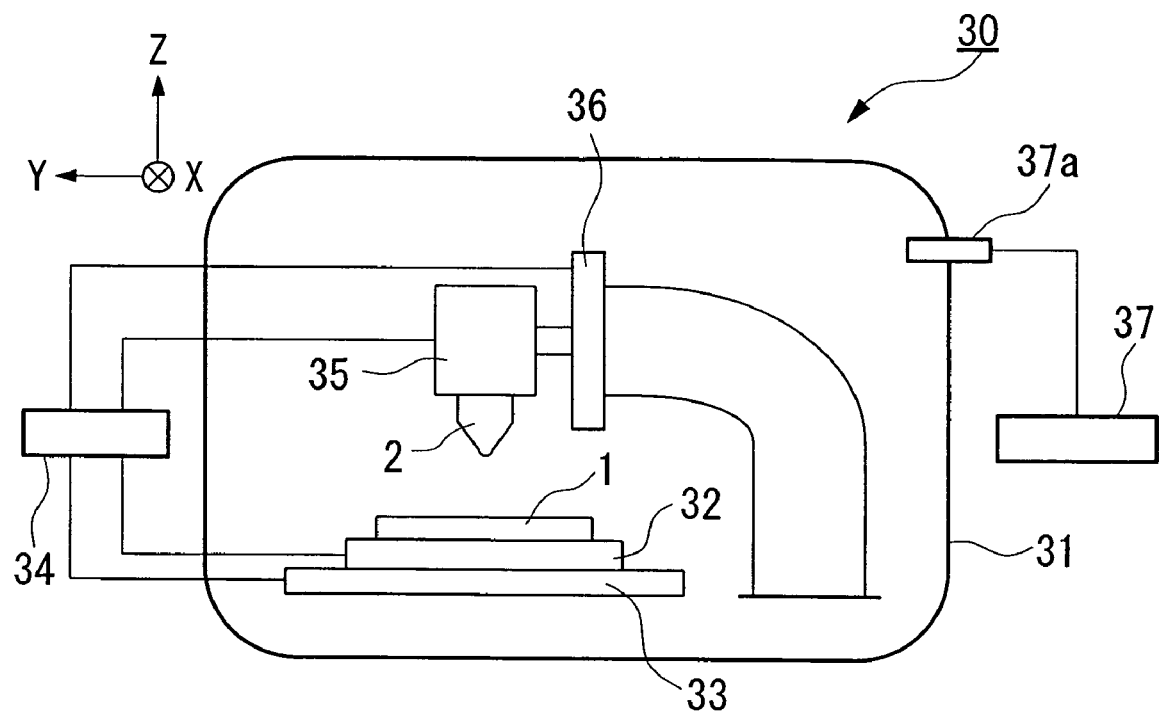
FIG. 3 is a schematic diagram showing an entire stress applying apparatus according to a third embodiment of the present invention.

Hereunder is a description of embodiments of the present invention with reference to the drawings.

FIG. 1A, FIG. 1B, FIG. 1C, FIG. 1D, FIG. 1E, and FIG. 1F are explanatory diagrams of an example of a process for forming a relief on the surface of a glass substrate according to a first embodiment of the present invention.

In the present embodiment, as a glass substrate being a processing object, a glass parent material is used containing $SiO_2$ and 1 mole % of $Al_2O_3$ or more wherein the $SiO_2$ content—$Al_2O_3$ content is from 40 to 67 mole %, which is beneficial for effectively forming a relief on the surface by chemical etching using an acidic medium (etching reagent). This glass parent material is a multi-component glass, containing $SiO_2$ as the main component and 1 mole % of $Al_2O_3$ or more. Using such glass parent material, since $Al_2O_3$ is easily leached into the acidic medium, the etching is promoted. Moreover, as the difference in the molar concentration between $SiO_2$ and $Al_2O_3$ ($SiO_2$—$Al_2O_3$) contained in the glass parent material is reduced ($Al_2O_3$ having a lower acid resisting property is relatively increased), the leaching is further promoted, increasing the etching rate rapidly.

In the process according to the present embodiment, firstly as shown in FIG. 1A, heat is applied onto a glass substrate 1 having such a composition, so as to raise the temperature of the glass substrate 1. The heat is applied until the temperature is raised at least to a degree so as not to generate cracks when an indenter 2 is pressed to apply an external force.

When the temperature of the glass substrate 1 is raised, subsequently as shown in FIG. 1B, the indenter 2 is lowered as shown by the arrow A to press the indenter 2 onto the glass substrate 1. Accordingly, a compression stressed part 3 having the temperature raised is formed on the surface of the glass substrate 1 and in the vicinity thereof. Actually at this time, a dent is formed on the surface of the glass substrate 1 by pressing the indenter 2, however it is omitted in FIG. 1B (same in FIG. 1C).

Subsequently, the glass substrate 1 is cooled down while pressing the indenter 2 onto the glass substrate 1. Then the indenter 2 is raised as shown by arrow B in FIG. 1C. Accordingly, a compression stressed part 4 is formed on the surface of the glass substrate 1 and in the vicinity thereof.

The compression stressed part 4 formed in this manner shows different chemical properties from the other parts (normal parts), causing a different etching rate when chemical etching is performed using an acidic medium. In more detail, the etching rate is lower in the compression stressed part 4, compared to the other parts (the etching speed is decreased). Although the mechanism has not yet been completely clarified, it is considered that; due to the glass structure change, the phase transformation, the raised density and the like in the compression stressed part 4, the compacted siloxane network prevents other components from being leached, while $Al_2O_3$ is selectively etched by the acidic medium in the other parts.

Subsequently, as shown in FIG. 1D to FIG. 1F, the chemical etching is performed using the acidic medium on the glass substrate 1 having the compression stressed part 4 formed thereon. As a result, as shown in FIG. 1D and FIG. 1E, it becomes more difficult to etch the compression stressed part 4 having the lower etching rate than that of the other parts, so that the compression stressed part 4 remains as a projection. Then, by further chemical etching using the acidic medium, a projection having a cone-shaped section is formed as shown in FIG. 1F.

In this manner, according to the step of the present embodiment, since the relatively small external force is applied to the glass substrate 1 while being heated to raise the temperature, there is no concern of cracking the glass substrate 1 when applying the external force and it is possible to prevent cracking when forming the compression stressed part 4, with higher probability.

Moreover, since the external force is applied to the glass substrate 1 while being heated to raise the temperature, a large load is not necessary but only a small load is enough to form the compression stressed part.

Moreover, since a relatively small external force is applied to the glass substrate 1 while being heated to raise the temperature, there is no concern of cracking regardless of the shape of the indenter 2 (the shape of the part pressed onto the glass substrate 1). For example, even in the case where an indenter having a relatively large bottom area, being the part in contact with the glass substrate 1 is used, there is no concern of cracking the glass substrate 1.

In the step according to the present embodiment, the $SiO_2$ content —$Al_2O_3$ content of the glass substrate 1 is preferably 40 mole % or more from the viewpoint of forming a glass substrate wherein the water resisting property is not deteriorated. Furthermore, it is preferably 47 mole % or more from the viewpoint of forming a glass substrate wherein a high projection can be effectively obtained with respect to the etching amount. On the other hand, the $SiO_2$ content —$Al_2O_3$ content of the glass substrate 1 is preferably 67 mole % or less from the viewpoint of forming a glass substrate wherein the acid resisting property is kept from reducing due to the addition of the large amount of $Al_2O_3$ into the glass substrate, the melting temperature is kept from increasing, and the composition homogeneity is high at a relatively low melting temperature. Furthermore, it is preferably 57 mole % or less from the viewpoint of forming a glass substrate wherein a high projection can be effectively obtained with respect to the etching amount.

Moreover, the $SiO_2$ content is preferably 40 mole % or more, while the $Al_2O_3$ content is essentially 1 mole % or more, but preferably 15 mole % or less as the upper limit. $SiO_2$ is the basic component of the glass substrate 1, and is preferably 40 mole % or more from the point of adding chemical resisting properties and projection forming properties. $Al_2O_3$ is preferably 15 mole % or less from the point of ensuring the dissolubility of the glass substrate to form a homogeneous glass substrate, and thereby reduce irregularities dependent on the projection forming location.

In this manner, the glass substrate 1 is not specifically limited and may be any material as long as; it contains $SiO_2$ and $Al_2O_3$ in the abovementioned ratio, the compression stressed part having the low etching rate can be easily formed by applying heat and an external force, and then cooling it down, and the projection can be formed by etching thereafter. Examples of the type of such glass substrate include aluminosilicate glass, aluminoborosilicate glass, borosilicate glass, and the like, any of which may be selected. $B_2O_3$ contained in the borosilicate glass and the like, is considered to show a similar action to $Al_2O_3$ in the glass substrate, and presents no obstacle even it is contained in the glass substrate 1.

Furthermore, in the process according to the present embodiment, the acidic medium used as the etching reagent is needed to selectively leach components other than $SiO_2$ from the glass substrate 1. Furthermore, it is required that the aforementioned selective leaching amounts by the chemical etching using the etching reagent are different between the compression stressed part and the other normal part. Therefore, the etching reagent is preferably an aqueous solution having pH 5 or less. Since components having the lower acid resisting property such as $Al_2O_3$ are selectively leached from the glass substrate by etching, the etching reagent is required to be slightly acidic. For such etching reagent, an acidic solution containing fluoride ions, for example hydrofluoric acid solution may be used. Moreover, for the acidic etching reagent, a solution to which is added at least any one type selected from; sulfuric acid, hydrochloric acid, nitric acid, phosphoric acid, sulfamic acid, oxalic acid, tartaric acid, malic acid, and citric acid, may be used.

In the process according to the present embodiment, the arrangement is such that one indenter 2 is pressed onto the glass substrate so as to apply the external force. However it may be such that a plurality of indenters 2 are pressed to apply the external force. In this manner, a plurality of projections may be formed on the surface of the glass substrate 1 by one pressing operation.

Next is a description of a second embodiment of the present invention.

This embodiment is suitable in the case where the glass substrate being the processing object is a material for which it is difficult to perform press-molding. Such glass substrate includes a crystallized glass or a quartz glass, an athermal glass and the like, having low thermal expansion and high transparency. The press-molding of glass means a method wherein glass is heated and softened, and then a mold processed into a desired shape is pressed onto the glass to transfer the shape, after which the glass is cooled down to solidify the glass so as to obtain the glass in the desired form. Therefore, the material for which it is difficult to perform press-molding includes a material for which it is difficult to form the compression stressed part by applying heat and external force, and then cooling it down as described above.

FIG. 2A, FIG. 2B, FIG. 2C, FIG. 2D, and FIG. 2E are explanatory diagrams of an example of a process for forming a relief on the surface of a glass substrate according to the present embodiment.

In the present embodiment, a crystallized glass is used for the glass substrate on which a relief is finally formed on the surface.

In order to form relief on the surface of such crystallized glass, firstly, as shown in FIG. 2A, a stress applying film 12 which is a film composed of inorganic material being the processing layer, is formed on the crystallized glass 11. This stress applying film 12 is capable of forming the compression stressed part having a different etching rate from that of the other parts, by applying heat and external force to the film and then cooling it down as described above, and is for example, the glass substrate 1 or the like being the processing object in the first embodiment.

Subsequently, as shown in FIG. 2B, the crystallized glass 11 having the stress applying film 12 formed thereon is mounted on a female mold 13 and heat is applied so as to raise the temperature of the stress applying film 12. The heat is applied until the temperature of the stress applying film 12 is raised at least to a degree where cracks are not generated when a mold 14 is pressed to apply the external force.

When the temperature of the stress applying film 12 is raised, consequently, the mold 14 is lowered to press the mold 14 onto the stress applying film 12. Accordingly, a compression stressed part having the temperature raised, and corresponding to the shape of the mold 14, is formed on the surface of the stress applying film 12 and in the vicinity thereof.

Subsequently, the stress applying film 12 is cooled down while pressing the mold 14 onto the stress applying film 12 and then the mold 14 is raised. Accordingly, a compression stressed part is formed on the surface of the stress applying film 12 and in the vicinity thereof.

Subsequently, chemical etching is performed using the acidic medium on the stress applying film 12 having the compression stressed part formed thereon in this manner. Accordingly, it becomes more difficult to etch the compression stressed part having the lower etching rate than that of the other parts, so that the compression stressed part remains as a projection. Then, as shown in FIG. 2C, a relief is formed on the surface of the stress applying film 12.

Subsequently, as shown in FIG. 2D, ion etching is performed on the crystallized glass 11 on which is formed the stress applying film 12 on which the relief is formed on the surface in the above manner. This ion etching is superior in reproducibility and uniformity, and is effective for etching an inactive material (material which is difficult to etch by chemical etching using an acidic medium), and is also effective for etching a composite material. Therefore, by performing ion etching on the crystallized glass 11 on which is formed the stress applying film 12 on which the relief is formed on the surface, as shown in FIG. 2E, the relief formed on the surface of the stress applying film 12 is reflected as is onto the crystallized glass 11, thus forming the relief on the surface of the crystallized glass 11.

In this manner, according to the process of the present embodiment, even on the crystallized glass 11 on which it is difficult to form the compression stressed part having the different etching rate from that of the other parts, it becomes possible to form a relief on the surface. Moreover, in the present process, since a relatively small external force is applied to the stress applying film 12 while being heated to raise the temperature, there is no concern of cracking the stress applying film 12 when applying the external force. Hence it is possible to prevent cracking when forming the compression stressed part, with higher probability, and it is possible to accurately form the compression stressed part corresponding to the shape of the mold 14.

In the process according to the present embodiment, the arrangement is such that the stress applying film 12 is all removed by ion etching so as to reflect the relief formed on the surface of the stress applying film 12 as is onto the crystallized glass 11. However it may be such that the stress applying film 12 partially remains as necessary.

In the process according to the present embodiment, the arrangement may be such that the heat and the external force are applied to the stress applying film 12 by pressing the heated mold 14 onto the stress applying film 12. In this case, for example, after heating the stress applying film 12 by contacting with the heated mold 14, it may be pressed. Accordingly, the heat and the external force may be applied with a simpler construction.

In the process according to the present embodiment, the arrangement is such that the external force is applied using the heated mold 14. However it may be such that one or a plurality of indenters 2 corresponding to the relief finally formed on the surface of the crystallized glass 11, are used to apply the external force. In this case, it may also be such that the heat and the external force are applied to the stress applying film 12 by pressing the indenters which have been heated thereon.

Next is a description of a third embodiment of the present invention.

A stress applying apparatus 30 according to this embodiment, as shown in FIG. 3, includes; an indenter 2 which applies an external force to the surface of the glass substrate 1 by pressing or pressing and sweeping so as to form the compression stressed part in a desired shape, a substrate heating device (heat source) 32 which contacts with the back face of the glass substrate to heat the glass substrate 1, and a movable stage (driving device) 33 which moves the substrate heating device 32 having the glass substrate 1 mounted thereon, inside a chamber 31, and a control unit (controller) 34.

Figure 4:
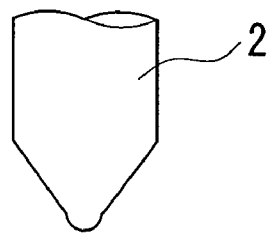
FIG. 4 is a plan view showing the point of an indenter used for the stress applying apparatus in FIG. 3.

An indenter heating device 35 which heats the indenter 2, and an indenter driving mechanism (driving device) 36 connected to the indenter heating device 35 are provided for the indenter 2. As shown in FIG. 4, the shape of the point of the indenter 2 is a part of a sphere, having a radius of 0.25 mm for example.

The indenter 2, the substrate heating device 32, the movable stage 33, the indenter heating device 35, and the indenter driving mechanism 36 are connected to the control unit 34. The movable stage 33 can move the substrate heating device 32 in the X and Y axis direction, enabling forming of the compression stressed part 3 in a desired shape. The indenter driving mechanism 36 can move the indenter in the Z axis direction, enabling adjustment of the external force applied to the glass substrate 1. That is, processing may be easily preformed under the desired processing conditions by respectively controlling the above-mentioned devices.

Moreover, on the sidewall of the chamber 31 is provided an inert gas inlet 37a which supplies inert gas to the chamber 31 from a gas supply device (gas supply means) 37.

Next is a description of a method for processing the glass substrate by the stress applying apparatus 30 of the present embodiment including the above construction.

Figure 5:
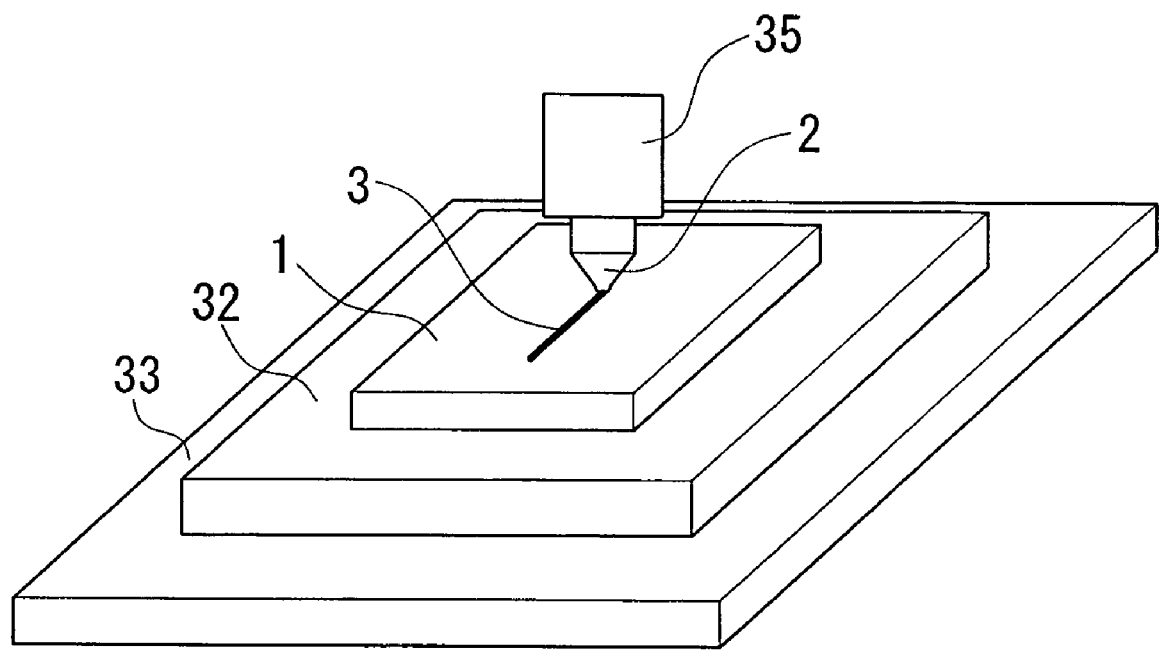
FIG. 5 is a perspective view showing the surface of a glass substrate having an indenter being swept thereon, used in the stress applying apparatus in FIG. 3.
Figure 6:
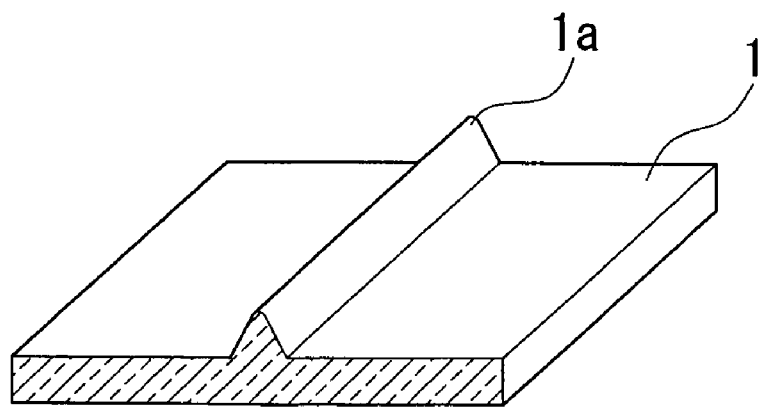
FIG. 6 is a perspective view showing a processed glass product formed by a third embodiment of the present invention.

Firstly, an inert gas is introduced into the chamber 31 by a gas supply device 37. Then, by means of the control unit 34, the substrate heating device 32 and the indenter heating device 35 are heated to 300° C., and the indenter driving mechanism 36 is moved in the Z axis direction so that the point of the indenter 2 is pushed into the surface of the glass substrate 1 for 1 μm. While pushing the indenter 2 in, the movable stage 33 is moved in the X and Y axis directions by the control unit 34 to form the desired shape. Consequently, as shown in FIG. 5, the indenter 2 is swept on the surface of the glass substrate 1 to form the compression stressed part 3. After forming the compression stressed part 3, the indenter 2 is raised by means of the control unit 34. Similarly to the first embodiment, by chemical etching, a ridge projection 1a having the cone-shaped section as shown in FIG. 6 is formed. In FIG. 5, the compression stressed part 3 is a straight line for simplification.

According to the stress applying apparatus 30 according to the present embodiment described above, since the surface of the glass substrate 1 is heated by the substrate heating device 32 and the indenter is heated by the indenter heating device 35, an excellent compression stressed part 3 can be formed. Moreover, by applying the external force to the glass substrate 1 in the inert gas atmosphere, the indenter 2 can be kept from being oxidized so that a more excellent compression stressed part 3 can be formed.

Furthermore, in the stress applying apparatus 30 according to the present embodiment, the compression stressed part 3 is formed on the surface of the glass substrate 1. However a film may be formed on the glass substrate 1 to form the compression stressed part 3 thereon. Furthermore, the surface of the glass substrate 1 and the indenter 2 are heated, however a similar effect may be obtained if the either one of them is heated. In the case where only the indenter is heated, the arrangement may be such that the indenter is contacted with the glass substrate to heat the glass substrate to raise the temperature, and it is pressed thereafter.

In the respective embodiments mentioned above, any one of an indenter, a mold, or particles may be used for applying the external force to the glass substrate 1.

Figure 7:
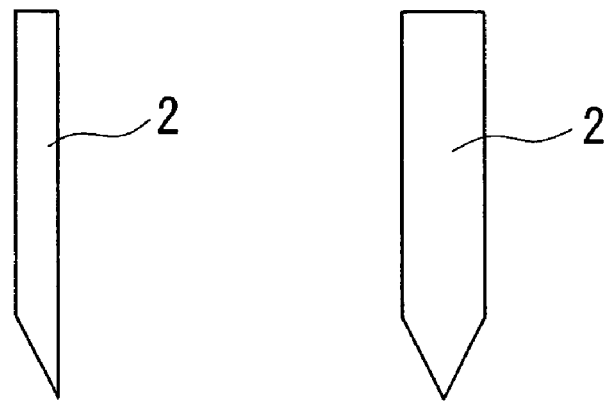
FIG. 7 is a plan view showing other examples of the shape of the indenter used for the first, second, and third embodiments of the present invention.
Figure 8:
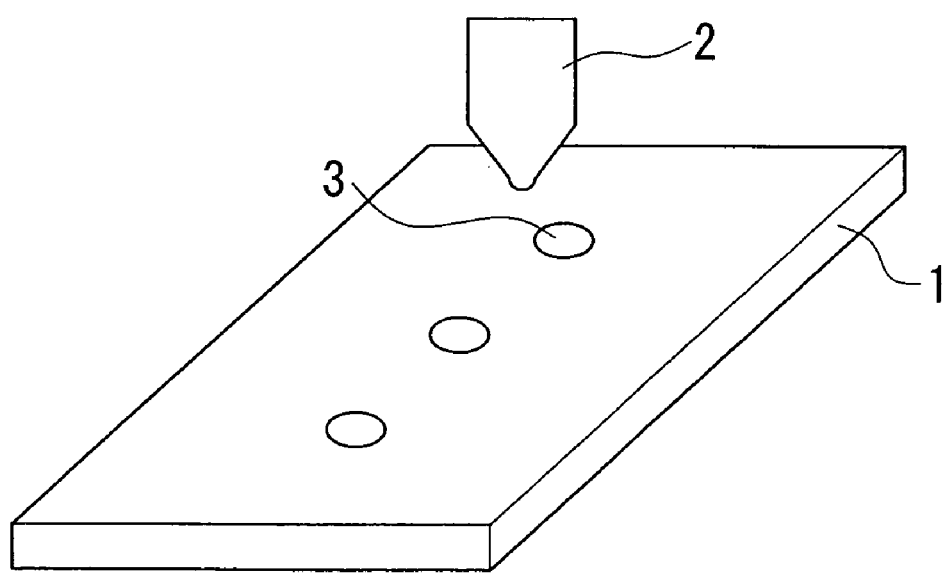
FIG. 8 is a perspective view showing the glass substrate having the indenter being pressed thereon, in the first, second, and third embodiments of the present invention.

Moreover, in addition to the spherical shape as shown in FIG. 4, the shape of the point of the indenter 2 may be a knife edge shape as shown in FIG. 7. If the glass substrate 1 is pressed using an indenter 2 having a partial spherical shape at the point with a radius of 0.25 mm, then as shown in FIG. 8, the indenter 2 is pressed into the glass substrate 1 so as to push the point of the indenter 2 in for 1 µm. Then, the indenter 2 is raised to release the pressing onto the glass substrate 1. The indenter 2 is then moved to a predetermined position so that the indenter is pressed again into the glass substrate 1 so as to push the point of the indenter in for 1 µm. By repeating this, it becomes possible to form compression stressed parts 3 in an array shape having predetermined intervals. In the respective embodiments mentioned above, the depth of the pushed-in indenter is controlled by position control. However it may be controlled by pressure control.

Figure 9:
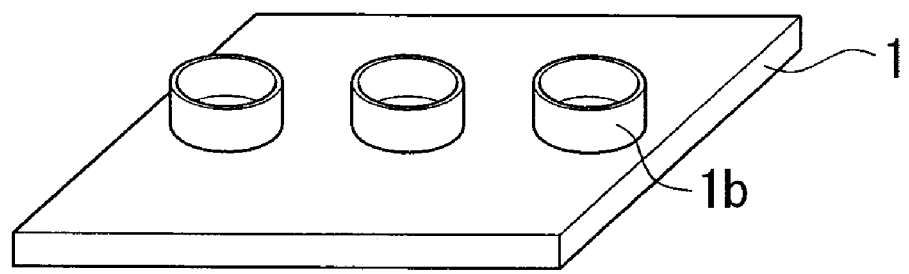
FIG. 9 is a perspective view showing an example of a processed glass product formed by pressing a mold onto the glass substrate in the first, second, and third embodiments of the present invention.
Figure 10:
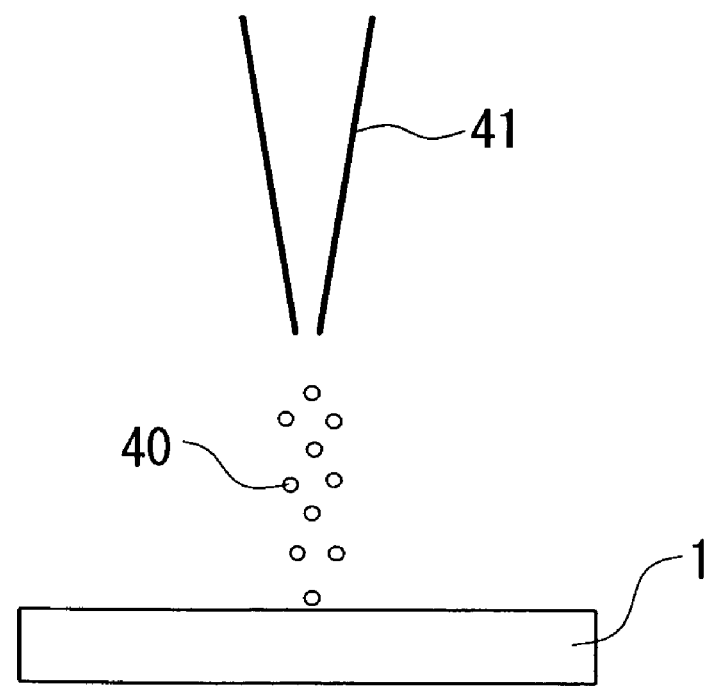
FIG. 10 is a side view showing the glass substrate having particles colliding thereon, in the first, second, and third embodiments of the present invention.

In the processes according to the respective embodiments mentioned above, a mold having a shape corresponding to the desired shape may be used instead of the indenter 2. For example, as shown FIG. 9, by pressing a mold having a toric pressing faces, toric projections 1b can be formed on the surface of the glass substrate 1 so that a glass substrate having a desired shape formed thereon can be obtained. Furthermore, particles 40 controlled for forming the desired shape may be used instead of the indenter 2 or the mold. In this case, as shown in FIG. 10, by making particles collide onto the surface of the glass substrate 1 by a sandblasting nozzle 41 as a particle ejecting device, a relief having a desired shape can be formed.

Particularly, according to the present process, since the indenter or the mold is pressed or the particles are made to collide by the relatively small external force while the glass substrate is heated to raise the temperature, there is no concern of cracking and it becomes possible to easily form the compression stressed part in a three-dimensional shape, which is suitable to obtain a desired three-dimensional object.

Moreover, in the processes according to the respective embodiments mentioned above, the arrangement may be such that other methods are jointly used to further form a part having a different etching rate from that of the other parts. For example, such other method may be a method for forming a compression stressed part by sweeping while pressing an indenter having a sharp point, a cutter knife, or the like (pressing and sweeping) onto the surface of the glass substrate. Accordingly, a similar effect may be obtained as in the case where the indenter 2 is pressed onto the glass substrate 1.

Furthermore, other methods also include a method of irradiating a laser beam onto the surface of the glass substrate to form a low density part where the so called network structure of the glass substrate is changed to a looser condition on the surface of the glass substrate and in the vicinity thereof. The chemical etching is easily performed on this low density part (having a high etching rate) so that it becomes possible to form depressions on the surface of the glass substrate by chemical etching using the acidic medium as mentioned above. By jointly using such other methods, it becomes possible to form a relief having a more complex shape on the surface of the glass substrate.

Furthermore, in the processes according to the respective embodiments mentioned above, the heat is firstly applied to the glass substrate 1. However the arrangement may be such that the heat and the external force are applied to the glass substrate 1 by pressing the heated indenter 2 or the mold 14 onto the glass substrate 1. In this case, for example, after heating the glass substrate 1 by contacting with the heated indenter 2 or the mold 14, it may be pressed. Accordingly, the heat and the external force may be applied with a simpler construction. Moreover, the arrangement may be such that the heat and the external force are applied to the glass substrate 1 by making heated particles collide onto the glass substrate 1. In this case, the relief can be randomly formed on the surface of the glass substrate 1. Furthermore, it becomes possible to increase the degree of freedom of processing by selecting the type of particles.

Moreover, the material of the mold, the indenter, or the particles mentioned above is preferably harder than the material of the glass substrate 1 on which the compression stressed part 3 is formed or the material of the film formed on the glass substrate 1. Accordingly, since the compression stressed part can be formed with a relatively small load, it becomes possible to prevent cracking, with higher probability. Furthermore, it becomes possible to suppress wear out or damage of the mold or the indenter.

Next is a specific description of when a relief is actually formed on the surface of the glass substrate, according to the processes according to the respective embodiments mentioned above.

In the present example, a quartz substrate was used for the glass substrate on which a relief is finally formed on the surface. A film (inorganic film) being the processing layer for this quartz substrate was formed by a reactive sputtering wherein an appropriate amount of Al plate is arranged on the Si target and RF sputtering was performed while appropriately introducing oxygen. The conditions were such that two sheet of 20 mm×40 mm Al plates were arranged on the Si target making the area ratio between Si and Al approximately 1:1, the amount of Ar gas introduced was 20 $cm^3$/min, the amount of oxygen gas introduced was 6 $cm^3$/min, the sputtering pressure was 0.2 Pa, and RF power was 1 kW, to form a film for 120 minutes.

The film formed in such a manner was analyzed to find out that the film thickness was 2600 nm and the atomic ratio between Si and Al was Si:Al=54:46.

The next process was for forming the compression stressed part on the film layer formed on the quartz substrate. The process for forming the compression stressed part on this film layer so as to form relief on the surface of the film layer by chemical etching using an etching reagent was in accordance with the process according to the first embodiment.

Figure 11:
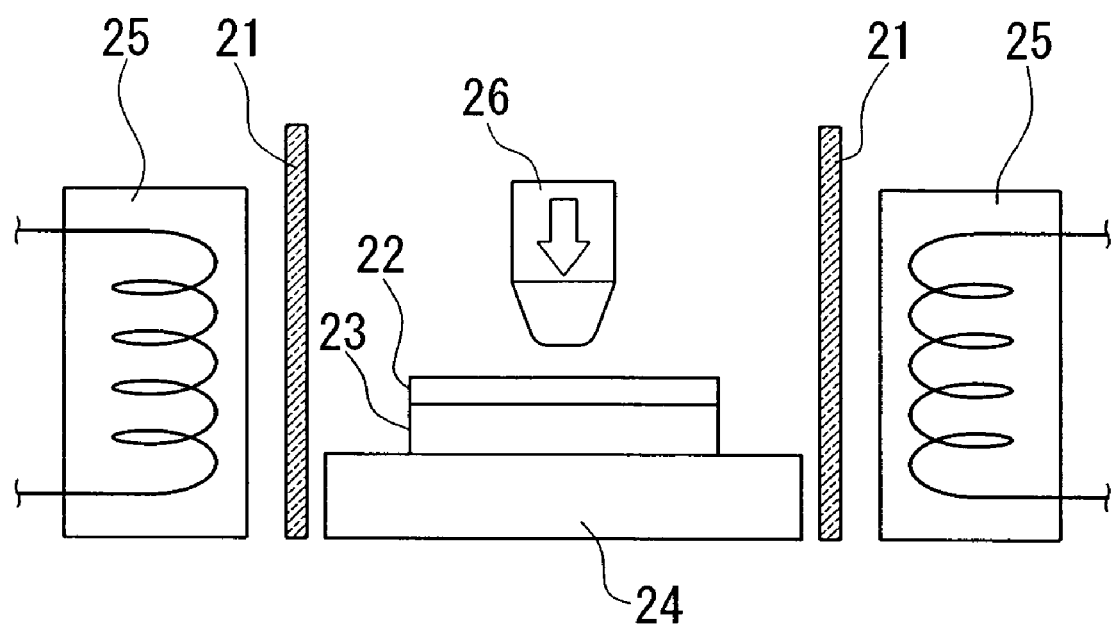
FIG. 11 shows an example of an apparatus which forms a compression stressed part on the surface of a film layer formed on a quartz substrate, and in the vicinity thereof.

FIG. 11 shows an example of an apparatus for forming the compression stressed part on the surface of the film layer formed on the quartz substrate, and in the vicinity thereof.

In the apparatus shown in FIG. 11, the arrangement is such that a forming chamber constituted by silica tubes 21 or the like, is made a nitrogen atmosphere, a quartz substrate 23 having a film layer 22 formed thereon is mounted on a female mold 24, and the temperature in the forming chamber is increased or decreased by a lamp heater 25 so as to heat or cool the film layer 22. Moreover, the pressing face of an indenter 26 has a toric shape having a 2.0 mm outer diameter and a 1.95 mm inner diameter.

Using such apparatus, firstly the film layer 22 formed on the quartz substrate 23 was heated to 350° C. in the nitrogen atmosphere. Then, the indenter 26 was lowered onto the film layer 22 to apply a load of 294 N (pressure 1.89 GPa) for 300 sec. Then, while applying the load of 294 N, the film layer 22 was cooled down to 200° C. and the indenter 26 was raised to release the load. The quartz substrate 23 having the film layer 22 formed thereon was taken out to measure the surface, to find out that a compression stressed part having a 400 nm dent was formed on the surface of the film layer 22 and in the vicinity thereof.

Subsequently, 2 μm of chemical etching was performed by soaking the quartz substrate on which the film layer formed with the compression stressed part was formed into hydrogen fluoride. The surface of the film layer formed on the quartz substrate obtained in this way was measured by a step meter, to find out that a 800 nm height of a caldera-shaped projection having a cone-shaped section was formed along the part having the compression stressed part formed on the surface.

Subsequently, ion etching by ion milling was performed on the quartz substrate on which the film layer having such a projection was formed. The conditions were such that the quartz substrate formed with the film layer was set in a vacuum chamber, the pressure was decreased to $4.0 \times 10^{-5}$ Pa, and then ion beams were irradiated to perform the ion etching, where the acceleration voltage was made 600 V, the acceleration current was made 120 mA, and the deceleration voltage was made −200 V. The ion incidence angle at this time was 30 degrees and the processing face was controlled to face downwards, and the etching was performed for 60 minutes. By such ion etching, a 1150 nm height of caldera-shaped projection was formed on the quartz substrate. In the present example, since the etching rate of the quartz substrate was as high as 49 nm/min compared to 33 nm/min for the etching rate of the film layer, the height of the projection formed on the surface of the quartz substrate after ion etching became higher compared to the height of the projection formed on the surface of the film layer before ion etching. Similarly, in the case where a high aspect ratio shaped projection is formed on the surface of crystallized glass substrate formed with the film layer, glass having a high etching rate is preferably used as the crystallized glass.

In the present example, the film was formed by the method described above. However, DC sputtering, ion beam sputtering may of course be applied. In addition, an evaporation method, a CVD method (chemical vapor deposition method), or the like may be also applied. Moreover, regarding the film forming material, in addition to the abovementioned materials, it is possible for example to arrange a Si wafer on an Al target, or make a mixed target of Si and Al, or use an oxidized substance for the film forming material instead of using reactive deposition method. Furthermore, regarding the control method of the composition ratio, in addition to the abovementioned control method by area ratio, a control method by the mixing ratio of the film forming material, or a control method by the input power after preparing the target, the evaporation source, the power source, and the ion gun separately for Si and Al, may be applied.

In the present example, the ion etching was performed by the method described above. However it is also possible to perform ion etching by applying various methods such as RIE (reactive ion etching), and the like. Moreover, by controlling the etching time according to the purpose of use, it is also possible to form a projection composed of the film layer and the quartz substrate.

Moreover, since the above processes have a characteristic to form the compression stressed part by applying heat and external force and then cooling it down, it is possible to form not only small compression stressed parts but also relatively large compression stressed part. Accordingly the optical element obtained is not only limited to of a minute size, but also relatively large one. The shape of the surface of the glass substrate may be not only planar but also curved as long as an external force can be applied thereon.

Figure 12A:
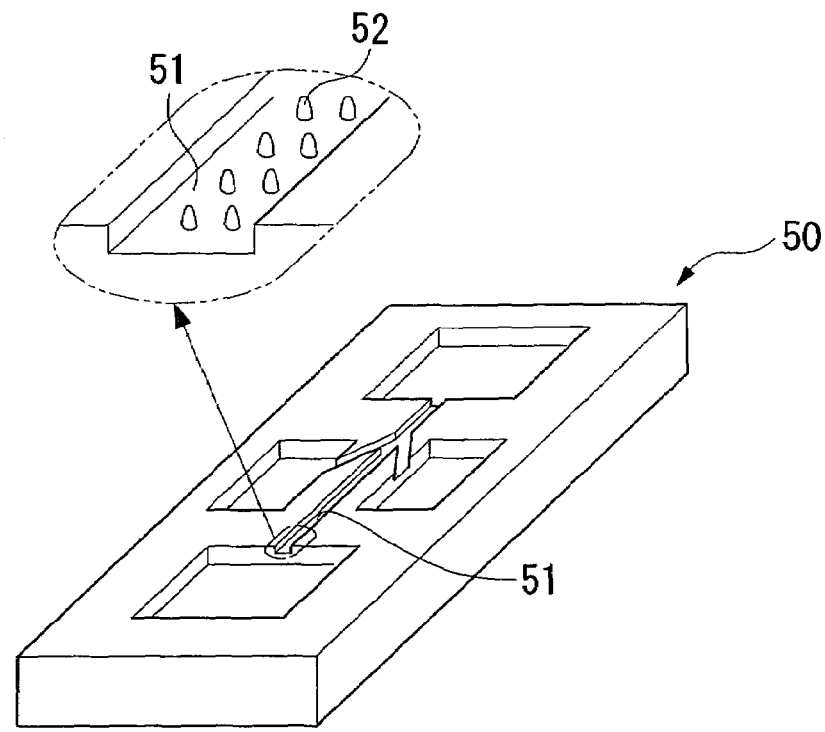
FIG. 12A and FIG. 12B are perspective views of an example when applying the first, second, and third embodiments of the present invention to a chip member for a microchemical system.

Furthermore, using the process for forming a relief on the surface of the glass substrate, a microchemical chip (chip member for a microchemical system) can also be obtained. As shown in FIG. 12A, a microchemical chip 50 is a device on which dents and ditches are formed for enabling various chemical operations on the substrate, and is made by a method such as photolithography. A ditch 51 having a minute pattern is extremely thin so that an amount of solution flowing in this ditch 51 is extremely small. Accordingly, surface tension or the like have an affect to increase the passage resistance, obstructing the flow. Therefore, minute projections 52 are distributedly formed on the bottom of the ditch 51 in order to solve this problem. For this purpose, the relief forming method according to the method of the present invention may be preferably employed.

Figure 12B:
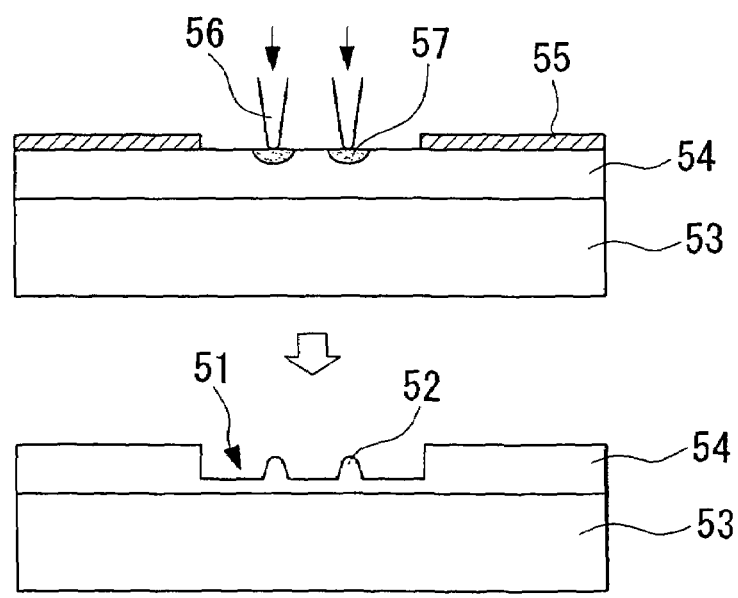
Figure 13:
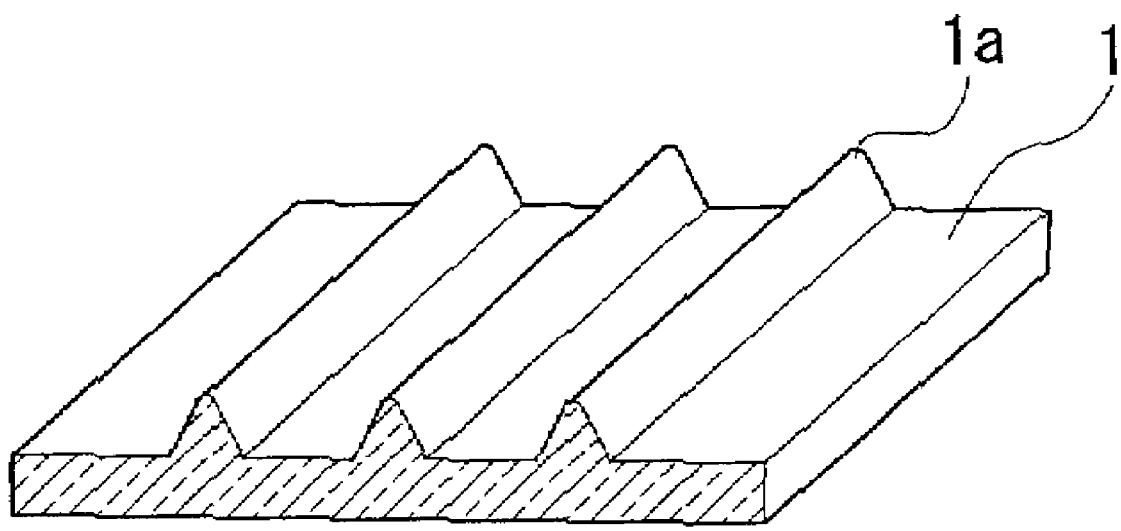
FIG. 13 is a perspective view showing a modified example of passages of the chip member for the microchemical system in FIG. 12A.

For example, a resist is used for forming the dent and the ditch. As shown in FIG. 12B, an inorganic film 54 composed of a chemically stable material is provided on a substrate 53 and an indenter 56 is pressed onto the desired region for forming the dent and the ditch, so as to form the compression stressed part 57. Then, a resist 55 is provided to open the desired region for forming the dent and the ditch. The etching is performed thereafter. Accordingly, the opening is etched so that the ditch 51 is formed and the projections 52 are formed in locations corresponding to the compression stressed parts 57 inside the opening, which contribute to reduce the passage resistance. That is, this method becomes a hybrid method combined with the conventional photolithography. In this manner, using the above processing method, compared to the conventional press processing, it is only needed to raise the temperature to a degree so as not to generate cracks on the surface of the glass substrate, so that it becomes unnecessary to raise the temperature for processing. Accordingly, the mold, the indenter, and the like may be kept from being deteriorated by heat. As the method for forming the passage pattern, the indenter 2 may be swept to form into a desired shape. The passage in this case becomes the bank shape as shown in FIG. 13.

In conclusion, as described in detail, according to the present invention, since the compression stressed part is formed by applying the relatively small external force to the glass substrate while being heated to raise the temperature and then cooling it down, it is possible to prevent cracking when forming the compression stressed part, with higher probability. Moreover, the processed glass product obtained by the processing method according to the present invention is not only limited to minute optical elements, but also relatively large ones.

Furthermore, while the processing method for glass substrate of the present invention and the processed glass product obtained by the processing method thereof have been described in detail, the present invention is not to be considered as being limited by the forgoing embodiments. Various modifications and alternation can be made without departing from the spirit or scope of the present invention.

As explained above, by forming a desired relief on the surface of a glass substrate, the present invention is suitable for making for example; a spacer, a high aspect ratio optical component, an R surface DOE (Diffractive Optical Element), a three-dimensional shaped object, a microlens array, a photonic crystal, a microprism, a grating, a microchemical chip, and the like.

As explained above, the present inventors have earnestly carried out research, resulting in the finding such that the cracking of glass substrate can be prevented with high probability if a compression stressed part having a different etching rate from that of the other parts with respect to the etching reagent to be used, is formed on the surface of glass substrate and in the vicinity thereof by applying heat and a relatively small external force to the glass substrate and then cooling it down. A further finding is that, regarding the application of heat and external force, there is a preferable range of temperature and external force wherein the cracking of glass substrate can be prevented with higher probability. The present invention has been completed based on such findings.

A first aspect of the present invention includes: applying heat and external force to a glass substrate and then cooling it down to thereby form a compression stressed part having a different etching rate from that of other parts with respect to an etching reagent to be used, on the surface of the glass substrate and in the vicinity thereof; and performing chemical etching using the etching reagent on the glass substrate having the compression stressed part formed thereon, so as to form a relief on the surface of the glass substrate.

According to this invention, since the compression stressed part is formed by applying a relatively small external force to the glass substrate while being heated to raise the temperature, and then cooling it down, there is no concern of cracking when applying the external force and it is possible to prevent cracking when forming the compression stressed part, with higher probability.

A second aspect of the present invention includes: forming a film composed of one or more layers of inorganic material on a glass substrate; applying heat and external force to the film and then cooling it down to thereby form a compression stressed part having a different etching rate from that of other parts with respect to an etching reagent to be used, on the surface of the film and in the vicinity thereof, and performing chemical etching using the etching reagent on the film having the compression stressed part formed thereon, so as to form a relief on the surface of the film.

According to this invention, since the compression stressed part is formed by applying a relatively small external force to the film composed of inorganic material while being heated to raise the temperature, and then cooling it down, there is no concern of cracking when applying the external force, and it is possible to prevent cracking when forming the compression stressed part, with higher probability.

A third aspect of the present invention includes, in the second aspect, performing etching on the glass substrate having the film with the relief formed on the surface, formed thereon, so as to form a relief on the surface of the glass substrate.

According to this invention, by performing etching such as ion etching which is superior in reproducibility and uniformity, the relief formed on the surface of the film can be reflected as is onto the surface of the glass substrate. Therefore, by forming the compression stressed part on the film while taking into consideration the relief to be formed on the surface of the glass substrate, it becomes possible to form the desired relief on the surface of the glass substrate. The present aspect is effective for example in the case where the glass substrate is a material for which it is difficult to form the compression stressed part.

A fourth aspect of the present invention is characterized in that, in the third aspect, a projection formed on the surface of the glass substrate is composed of the glass substrate, or the glass substrate and the film.

According to this invention, the projection composed of only glass substrate or the projection composed of the glass substrate and the film are formed on the surface of the glass substrate.

A fifth aspect of the present invention is characterized in that, in the fourth aspect, a material having a higher etching rate than that of the film is used for the glass substrate.

According to this invention, since the glass substrate is etched more rapidly than the film, then for example a projection having a high aspect ratio shape can be formed on the surface of the glass substrate.

A sixth aspect of the present invention is characterized in that, in any one of the first through fifth aspects, the external force is applied by pressing a mold having a desired shape.

According to this invention, since a three-dimensional compression stressed part corresponding to the shape of the mold can be formed, it is possible to obtain a three-dimensional object as a processed glass substrate.

A seventh aspect of the present invention is characterized in that, in the sixth aspect, the heat and external force are applied by pressing the mold which has been heated.

According to this invention, it becomes possible to apply heat and external force to the film formed on the glass substrate or the glass substrate, with a simpler construction.

An eighth aspect of the present invention is characterized in that, in either one of the sixth and the seventh aspects, the material of the mold is harder than the material of a part of the glass substrate or the material of film formed on the glass substrate, to which the heat and external force are applied.

According to this invention, when the heat and the external force are applied to the glass substrate or the film, the hardness of the glass substrate or the film which forms the compression stressed part is reduced below the hardness at room temperature. Since at this time the compression stressed part can be formed with a relatively small load by forming the compression stressed part on the surface of the glass substrate or the surface of the film by the mold of a material having a higher hardness than that of the glass substrate or the film, it is becomes possible to prevent cracking, with higher probability. Moreover, it becomes possible to suppress wear out or damage of the mold.

A ninth aspect of the present invention is characterized in that, in any one of the first through fifth aspects, the external force is applied by pressing an indenter.

According to this invention, since the compression stressed part is formed on the part where the indenter was pressed, it is possible to obtain a desired shaped object as a processed glass substrate.

A tenth aspect of the present invention is characterized in that, in the ninth aspect, the heat and external force are applied by pressing the indenter which has been heated.

According to this invention, it becomes possible to apply the heat and the external force to the glass substrate with a simpler construction.

An eleventh aspect of the present invention is characterized in that, in either one of the ninth and tenth aspects, the external force is applied by pressing and sweeping the indenter.

According to this invention, since the external force is applied by pressing and sweeping the indenter, it becomes possible to prevent cracking when forming the compression stressed part, with higher probability, and to form the desired shaped compression stressed part easily.

A twelfth aspect of the present invention is characterized in that, in any one of the ninth through eleventh aspects, a point of the indenter is in the shape of part of a sphere.

According to this invention, since the point of the indenter is in the shape of part of a sphere, when pressing the indenter onto the surface of the glass substrate or the surface of the film, it becomes possible to ensure the contact area of the indenter with the surface of glass substrate or the surface of the film, so that the pressure applied to the surface of glass substrate or the surface of the film can be easily controlled.

A thirteenth aspect of the present invention is characterized in that, in any one of the ninth through eleventh aspects, a point of the indenter is in a knife edge shape.

According to this invention, since the point of the indenter is in a knife edge shape, the indenter can be easily swept in a fixed direction.

A fourteenth aspect of the present invention is characterized in that, in any one of the ninth through thirteenth aspects, the indenter is multiply provided.

According to this invention, a plurality of projections can be formed on the surface of the glass substrate or the surface of the film by one pressing operation.

A fifteenth aspect of the present invention is characterized in that, in any one of the ninth through fourteenth aspects, the material of the indenter is harder than the material of a part of the glass substrate or the material of film formed on the glass substrate, to which the heat and external force are applied.

According to this invention, since the compression stressed part can be formed with a relatively small load by forming the compression stressed part on the surface of the glass substrate or the surface of the film by the indenter of a material having a higher hardness than that of the glass substrate or the film, when the heat and the external force are applied to the glass substrate or the film, it becomes possible to prevent cracking, with higher probability. Moreover, it becomes possible to suppress wear out or the damage of the indenter.

A sixteenth aspect of the present invention is characterized in that, in any one of the first through fifth aspects, the external force is applied by making particles collide.

According to this invention, by selecting particles having different diameters or material, it becomes possible to form the compression stressed part corresponding to the characteristics of the particle.

A seventeenth aspect of the present invention is characterized in that, in the sixteenth aspect, the heat and external force are applied by making the particles which have been heated collide.

According to this invention, it becomes possible to apply the heat and the external force to the glass substrate with a simpler construction.

An eighteenth aspect of the present invention is characterized in that, in either one of the sixteenth and seventeenth aspects, the particles are controlled to collide so as to make the compression stressed part into a desired shape.

According to this invention, by selectively making the particles collide on the surface of glass substrate or the surface of the film, it becomes possible to form the compression stressed part in a desired shape.

A nineteenth aspect of the present invention is characterized in that, in any one of the sixteenth through eighteenth aspects, the material of the particle is harder than the material of a part of the glass substrate or the material of film formed on the glass substrate, to which the heat and external force are applied.

According to this invention, since the compression stressed part can be formed with a relatively small load by forming the compression stressed part on the surface of glass substrate or the surface of the film by the particles of a material having a higher hardness than that of the glass substrate or the film, when the heat and the external force are applied to the glass substrate or the film, it is becomes possible to prevent cracking, with higher probability.

A twentieth aspect of the present invention is a processed glass product wherein a relief is formed on the surface by the processing method of any one of the first through nineteenth aspects.

A twenty-first aspect of the present invention is characterized in that, in the twentieth aspect, the processed glass product is a chip member for a microchemical system.

According to the twentieth and twenty-first aspects of the invention, it is possible to provide a processed glass product such as a chip member for a microchemical system, wherein no cracking is found in the processed part and the properties of the unprocessed part are not changed.

A twenty-second aspect of the present invention includes: an indenter which applies an external force by pressing or pressing and sweeping onto the surface of a glass substrate or a film formed on the glass substrate so as to form a compression stressed part of a desired shape; a heat source which heats at least one of the surface of the glass substrate or the surface of the film, and the indenter; a driving device which moves at least one of the indenter and the glass substrate; and a controller which controls the driving device and the heat source.

According to this invention, the driving device is controlled by the controller to relatively move the indenter and the glass substrate and to press or press and sweep the indenter so that the external force is applied onto the glass substrate or the film so as to form a desired shape. At this time, since at least one of the surface of the glass substrate or the surface of the film, and the indenter is heated, it becomes possible to form an excellent compression stressed part.

A twenty-third aspect of the present invention includes: a mold which applies an external force by pressing onto the surface of a glass substrate or a film formed on the glass substrate so as to form a compression stressed part of a desired shape; a heat source which heats at least one of the surface of the glass substrate or the surface of the film, and the mold; a driving device which moves at least one of the mold and the glass substrate; and a controller which controls the driving device and the heat source.

According to this invention, the driving device is controlled by the controller to relatively move the mold and the glass substrate and to press the mold so that the external force is applied onto the glass substrate or the film so as to form a desired shape. At this time, since at least one of the surface of the glass substrate or the surface of the film, and the mold is heated, it becomes possible to form an excellent compression stressed part.

A twenty-fourth aspect of the present invention includes: a particle ejecting device which ejects particles onto the surface of a glass substrate or a film formed on the glass substrate so as to form a compression stressed part of a desired shape; a heat source which heats at least one of the surface of the glass substrate or the surface of the film and the particles; a driving device which moves at least one of the particle ejecting device and the glass substrate; and a controller which controls the driving device and the heat source.

According to this invention, the driving device is controlled by the controller to relatively move the particle ejecting device and the glass substrate and to eject particles from the particle ejecting device, to thereby apply an external force onto the glass substrate or the film so as to form a desired shape. At this time, since at least one of the surface of the glass substrate or the surface of the film, and the particles is heated, it becomes possible to form an excellent compression stressed part.

A twenty-fifth aspect of the present invention is characterized in that in any one of the twenty-second through twenty-fourth aspects, there is provided a gas supply device which supplies an inert gas into a chamber accommodating the glass substrate.

According to this invention, by applying the external force to the glass substrate in an inert gas atmosphere, the indenter, the mold, the particle ejecting device, and other members constituting the stress applying apparatus can be kept from being oxidized, so that a more excellent compression stressed part can be formed.

What is claimed is:

1. A processing method for glass substrate comprising:
   applying heat and partially and directly applying external force to a glass substrate and then cooling it down to thereby form a compression stressed part having a different etching rate from that of other parts with respect to an etching reagent to be used, on the surface of said glass substrate and in the vicinity thereof; and
   performing chemical etching using said etching reagent on the glass substrate having said compression stressed part formed thereon, so as to form a relief on the surface of said glass substrate, wherein
   said external force is applied by pressing an indenter.

2. A processing method for glass substrate comprising:
   forming a film composed of one or more layers of inorganic material on a glass substrate;
   applying heat and partially applying external force to said film and then cooling it down to thereby form a compression stressed part having a different etching rate from that of other parts with respect to an etching reagent to be used, on the surface of said film and in the vicinity thereof; and
   performing chemical etching using said etching reagent on said film having said compression stressed part formed thereon, so as to form a relief on the surface of said film, wherein
   said external force is applied by pressing an indenter.

3. The processing method for glass substrate according to claim 2, comprising: performing etching on said glass substrate having the film with said relief formed on the surface, formed thereon, so as to form a relief on the surface of said glass substrate.

4. The processing method for glass substrate according to claim 3, wherein a projection formed on the surface of said glass substrate is composed of said glass substrate, or said glass substrate and said film.

5. The processing method for glass substrate according to claim 4, wherein a material having a higher etching rate than that of said film is used for said glass substrate.

6. The processing method for glass substrate according to claim 1 or 2, wherein said heat and external force are applied by pressing said indenter which has been heated.

7. The processing method for glass substrate according to claim 1 or 2, wherein said external force is applied by pressing and sweeping said indenter.

8. The processing method for glass substrate according to claim 1 or 2, wherein a point of said indenter is in the shape of a part of a sphere.

9. The processing method for glass substrate according to claim 1 or 2, wherein a point of said indenter is in a knife edge shape.

10. The processing method for glass substrate according to claim 1 or 2, wherein said indenter is multiply shaped.

11. The processing method for glass substrate according to claim 1 or 2, wherein the material of said indenter is harder than the material of a part of said glass substrate or the material of film formed on said glass substrate, to which said heat and external force are applied.

12. A processing method for glass substrate, comprising:
   applying heat and partially and directly applying external force to a glass substrate and then cooling it down to thereby form a compression stressed part having a different etching rate from that of other parts with respect to an etching reagent to be used, on the surface of said glass substrate and in the vicinity thereof; and
   performing chemical etching using said etching reagent on the glass substrate having said compression stressed part formed thereon, so as to form a relief on the surface of said glass substrate,
   wherein said external force is applied by making particles collide.

13. A processing method for glass substrate comprising:
   forming a film composed of one or more layers of inorganic material on a glass substrate;
   applying heat and partially applying external force to said film and then cooling it down to thereby form a compression stressed part having a different etching rate from that of other parts with respect to an etching reagent to be used, on the surface of said film and in the vicinity thereof; and
   performing chemical etching using said etching reagent on said film having said compression stressed part formed thereon, so as to form a relief on the surface of said film, wherein
   said external force is applied by making particles collide.

14. The processing method for glass substrate according to claim 12 or 13, wherein said heat and external force are applied by making said particles which have been heated collide.

15. The processing method for glass substrate according to claim 12 or 13, wherein said particles are controlled to collide so as to make said compression stressed part into a desired shape.

16. The processing method for glass substrate according to claim 12 or 13, wherein the material of said particle is harder than the material of a part of said glass substrate or the material of film formed on said glass substrate, to which said heat and external force are applied.

17. A processed glass product comprising a relief formed on the surface thereof by the processing method according to any one of claims 1, 2, 12, and 13.

18. The processed glass product according to claim 17, wherein said processed glass product is a chip member for a microchemical system.

* * * * *